United States Patent [19]
Farris

[11] Patent Number: 6,064,653
[45] Date of Patent: May 16, 2000

[54] INTERNETWORK GATEWAY TO GATEWAY ALTERNATIVE COMMUNICATION

[75] Inventor: Robert D. Farris, Sterling, Va.

[73] Assignee: Bell Atlantic Network Services, Inc., Arlington, Va.

[21] Appl. No.: 08/779,458

[22] Filed: Jan. 7, 1997

[51] Int. Cl.[7] .................................................. H04L 12/66
[52] U.S. Cl. .......................................... 370/237; 370/352
[58] Field of Search .................................. 370/352, 353, 370/354, 355, 356, 400, 401, 402, 403, 404, 405, 406, 407, 408, 409, 468, 237, 238; 379/221, 220; 340/827

[56] References Cited

U.S. PATENT DOCUMENTS

| | | |
|---|---|---|
| 4,652,700 | 3/1987 | Matthews et al. . |
| 4,827,500 | 5/1989 | Binkerd et al. . |
| 4,872,160 | 10/1989 | Hemmady et al. . |
| 4,958,341 | 9/1990 | Hemmady et al. . |
| 5,008,926 | 4/1991 | Misholi . |
| 5,012,511 | 4/1991 | Hanle et al. . |
| 5,029,199 | 7/1991 | Jones et al. . |
| 5,193,110 | 3/1993 | Jones . |
| 5,206,901 | 4/1993 | Harlow et al. . |
| 5,208,848 | 5/1993 | Pula . |
| 5,247,571 | 9/1993 | Kay et al. . |
| 5,309,437 | 5/1994 | Perlman et al. . |
| 5,341,374 | 8/1994 | Lewen et al. . |
| 5,375,068 | 12/1994 | Palmer et al. . |
| 5,406,557 | 4/1995 | Baudoin . |
| 5,410,754 | 4/1995 | Klotzbach et al. . |
| 5,430,727 | 7/1995 | Callon . |
| 5,434,913 | 7/1995 | Tung et al. . |
| 5,490,247 | 2/1996 | Tung et al. . |
| 5,493,568 | 2/1996 | Sampat et al. . |
| 5,493,573 | 2/1996 | Kobayashi et al. ...................... 370/468 |
| 5,572,583 | 11/1996 | Wheeler, Jr. et al. . |
| 5,608,786 | 3/1997 | Gordon . |
| 5,712,907 | 1/1998 | Wegner et al. . |
| 5,724,355 | 3/1998 | Bruno et al. . |
| 5,726,984 | 3/1998 | Kubler et al. . |
| 5,732,078 | 3/1998 | Arango .................................... 370/355 |
| 5,768,513 | 6/1998 | Kuthyar et al. . |

OTHER PUBLICATIONS

Weisser et al., "The Intelligent Network and Forward–Looking Technology," IEEE Comm. Magazine, Dec. 1988, pp. 64–69.

Shah et al., "Application of a New Network Concept for Faster Service Deployment," International Conference on Comm. '88, Jun. 12–15, 1988, IEEE Comm. Soc. Conf. Record, vol. 3, pp. 1327–1329.

*Primary Examiner*—Huy D. Vu
*Attorney, Agent, or Firm*—McDermott, Will & Emery

[57] ABSTRACT

Voice calls between two end location gateway servers of a data internetwork are diverted, during periods of unacceptable network conditions, through the public switched telephone network (PSTN). A plurality of such diverted calls may be multiplexed into a single ISDN or T1 channel, thereby permitting a sharing of the more expensive cost of PSTN routing. Incoming calls are appropriately formatted for digital transmission, including compression when applicable, by the gateway servers and multiplexed for transmission either through the data network or back through an ISDN channel or the like through the PSTN. Calls may be expeditiously re-routed back through the data internetwork when data network conditions improve.

16 Claims, 9 Drawing Sheets

INTERNETWORK GATEWAY TO GATEWAY ALTERNATIVE COMMUNICATION

RELATED APPLICATIONS

This application is related to application Ser. No. 08/822,602, filed Mar. 19, 1997 and entitled TRANSPORT OF CALLER IDENTIFICATION INFORMATION THROUGH DIVERSE COMMUNICATION NETWORKS, to application Ser. No. 08/815,361, filed and Mar. 11, 1997 and entitled PACKET DATA NETWORK VOICE CALL QUALITY MONITORING, to application Ser. No. 08/821,027, filed Mar. 19, 1997 and entitled VOICE CALL ALTERNATIVE ROUTING THROUGH PSTN AND INTERNET NETWORKS, to application Ser. No. 08/634,544, entitled UNIVERSAL ACCESS MULTIMEDIA NETWORK, filed Apr. 18, 1996, to application Ser. No. 08/634,543, entitled INTERNET TELEPHONE SERVICE, filed Apr. 18, 1996 and to application Ser. No. 08/670,908, entitled INTERNET TELEPHONE SYSTEM, filed Jun. 28, 1996. The specifications of those applications are incorporated herein by reference in their entirety.

TECHNICAL FIELD

The present invention relates to telecommunications networks and more particularly to alternative routing of voice calls placed through a data internetwork.

BACKGROUND OF THE INVENTION

As provision of voice telephone services on a world wide basis progresses, an expanding variety of networks are being utilized to handle the high volume of traffic throughput. The recent development of data network capability, such as the Internet, for voice call communication offers advantages that are now being explored. The Internet was initially intended to accommodate transmission of data, not necessarily on a real time basis. Acclimation of such data networks to the stringent voice transmission requirements of real time, high quality communication presents developmental challenges.

The emergence of Integrated Services Digital Network (ISDN) technology has enabled local area networks to be interconnected with each other to form a wider area network and to enable a local area network to be accessed by a remote personal computer and operated as if the computer were resident on the network. ISDN has integrated computer and communications technologies to provide, worldwide, a common, all-digital network. By virtue of a standardized structure of digital protocols, implementation of multiple networks within national boundaries, appears to a user as a single, uniformly accessible, worldwide network capable of handling a broad range of telephone, data and other conventional and enhanced services.

ISDN is configured for carrying both voice and data communication. Within the framework of ISDN, the network provides services and the user accesses the services through the user-network interface. A "channel" represents a specified portion of the information carrying capacity of an interface. Channels are classified by two types, Basic Rate ISDN (BRI) and Primary Rate ISDN (PRI). BRI delivers two B-channels, each having a capacity of 64 Kbps, capable of transmitting voice and data simultaneously. A 16 Kbps D-channel transmits call control messages and user packet data. PRI provides twenty three B-channels of 64 Kbps capacity each for carrying voice, circuit switched data or packet data. The D-channel is a 64 Kbps signaling channel. The B and D channels are logically multiplexed together. Particular description of conventional ISDN interfaces at the customer premises, the local loop at the carrier end and exchange switching equipment is not believed necessary to the present disclosure. Details of such architecture may be found in ISDN: An Overview, Data Pro Research, Concepts & Technologies, MT 20-365; pp 101–110, published by McGraw Hill, Incorporated (December 1988).

The Internet basically comprises several large computer networks joined together over high-speed data links ranging from ISDN to T1, T3, FDDI, SONET, SMDS, OT1, etc. The most prominent of these national nets are MILNET (Military Network), NSFNET (National Science Foundation NETwork), and CREN (Corporation for Research and Educational Networking). Network standards, conventions and protocols have evolved for interconnecting networks and routing information in an orderly manner. These protocols, commonly referred to as TCP/IP (Transport Control Protocol/Internet Protocol), have become widely used in the industry. TCP/IP is flexible and robust. In effect, TCP takes care of the integrity and IP moves the data. Internet provides two broad types of data services: connectionless packet delivery service and reliable stream transport service. To accommodate telephone service for usage by ordinary analog telephone sets, analog voice signals are converted to appropriate data format for transmission through data networks and then reconverted to analog before being received at the destination.

A simplified diagram of the Internet is depicted in FIG. 1. The Internet 50 comprises Autonomous Systems (AS) which may be owned and operated by Internet Service Providers (ISPs) such as PSI, UUNET, MCI, SPRINT, etc. Three such AS/ISPs are shown in FIG. 1 at 52, 54 and 56. The Autonomous Systems are linked by Inter-AS Connections 58, 60 and 62. Information Providers (IPs) 64 and 66, such as America Online (AOL) and Compuserve, are connected to the Internet via high speed lines 68 and 70, such as T1/T3 and the like. Information Providers generally do not have their own Internet based Autonomous Systems but have or use Dial-Up Networks such as SprintNet (X.25), DATAPAC and TYMNET.

Other information providers, such as universities, are indicated in exemplary fashion at 72 and are connected to the AS/ISPs via the same type connections, here illustrated as T1 lines 74. Corporate Local Area Networks (LANs), such as those illustrated at 76 and 78, are connected to the Internet through routers 80 and 82 and links shown as T1 lines 84 and 86. Laptop or PC computers 88 and 90 are representative of computers connected to the Internet via the public switched telephone network (PSTN), shown connected to the AS/ISPs via dial up links 92 and 96.

The Information Providers (IPs) are end systems that collect and market the information through their own servers. Access providers are companies such as UUNET, PSI, MCI and SPRINT which transport the information. Such companies market the usage of their networks.

In simplified fashion the Internet may be viewed as a series of gateway routers connected together with computers connected to the routers. In the addressing scheme of the Internet an address comprises four numbers separated by dots. An example would be 164.109.211.237. Each machine on the Internet has a unique number that includes one of these four numbers. In the address, the leftmost number is the highest number. By analogy this would correspond to the ZIP code in a mailing address. The first two numbers that constitute this portion of the address may indicate a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This process continues until the packet arrives at the destination computer. The separate packets that constitute a message may not travel the same path, depending on traffic load. However, they all reach the same destination and are assembled in their original sequence order in a connectionless fashion. This is in contrast to connection oriented modes such as frame relay and ATM or voice.

Software has recently been developed for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers. The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

The commonly assigned applications, Ser. Nos. 08/634,543 and 08/670,908, identified more particularly above, are concerned with providing telephone service via the Internet to users of the public telecommunications network who may not have access to a computer or other access to the Internet. Conversion of analog voice signals into digital format appropriate for Internet transmission and conversion of digital signals received from the Internet back to voice analog signals are functions performed by the telephone service provider rather than a POTS subscriber's PC. Such service would be economical, especially for long distance calls, compared with the toll rates charged by long distance interexchange carriers.

With increasing volume of use on the Internet and the bursty nature of data transmission, traffic patterns have become unstable and unpredictable. The minimum quality of service acceptable for voice communication is much higher than the level for data transport as transmission delays noticeably degrade conversation. With the Internet or other high volume data network, acceptable voice communication may be available between two end points at one given time, but not at other times. A surge in data traffic may make the network unsuitable for voice communication for as much as twenty or thirty minutes. Bottlenecks may occur at different points in the network at different times. The locations of the participants of a voice call are factors in determining suitability of the data network. The degree to which degradation of a voice call remains acceptable is subjective with the user and can be a tradeoff between quality of service and reduction of cost.

A deficiency in earlier proposed voice Internet service systems is the inability to ensure an acceptable level of service quality. Voice communication by nature should be perceived as real time interaction in order to be acceptable to the parties to the call. The packet data network traffic in the connection paths of a voice call may render intolerable transmission delays. A high level of congestion and delay in a data network often leads to lost or dropped data packets that would noticeably degrade reconstructed voice audio. Current systems do not measure delays against user acceptable standards. The voice call user must either endure such deficiencies or terminate the call in favor of originating a new call through an alternative system.

The aforementioned commonly assigned application Ser. No. 08/821,027 (Attorney docket No. 680-189), is concerned with determining routing of voice calls alternatively between the public switched telephone network (PSTN) and a data packet network, such as the Internet, in accordance with the quality of service existing in the data packet network at the times of call origination. Through use of the PSTN Advanced Intelligent Network (AIN), a caller may predefine an acceptable level of service, for example 2.4 or 4.8 kbs to be stored in the user's Call Processing Record (CPR) in the AIN Integrated Services Control Point (ISCP). On a per call basis, the caller linked to a first public switched network may indicate a preference to route through the Internet. This indication would be recognized by the AIN system, in response to which the quality of service currently present on the Internet for completion of the call is measured. If the result exceeds the stored threshold, the call is set up and routed through the Internet to the switched network link to the destination party. If the quality of service on the Internet is not satisfactory, the call would be alternatively routed through the PSTN, which may include an Interexchange Carrier link.

The last described arrangement is an improvement over prior voice data network schemes in the respect that determination of data network performance quality avoids set up of a call that can be known at the outset to be inadequate for voice communication. However, with relatively unstable and unpredictable traffic patterns in data networks such as the Internet, the alternative set up arrangement does not accommodate for degradation of data network performance conditions after a call has been placed and routed through the data network. Thus, parties to such a call still must either suffer the deficiencies in voice quality, perhaps in the hope that data traffic conditions improve, or terminate the call in favor of a new call manually placed through the switched telephone network.

The aforementioned commonly assigned application Ser. No. 08/815,361 (Attorney docket No. 680-190), is concerned with monitoring the quality of service existing in a data packet network during the course of communication of a voice call through the data network. The user's acceptable level of service may be predefined with a threshold quality level stored in the user's Call Processing Record (CPR) in the AIN Integrated Services Control Point (ISCP). If the monitored quality is maintained in excess of the stored threshold, communication of the call continues through the established course of transmission. If the measured quality of service on the data network is not satisfactory, the routing of the call is changed to communication solely through a traditional PSTN voice telephone network connection, which may include an Interexchange Carrier link, without terminating the call. The packet data network is bypassed to obtain voice grade quality while maintaining the call between the parties. The call through the data packet network is terminated at that time.

While these quality oriented schemes significantly improve so-called Internet type voice call service by avoiding transmission of calls of unacceptable quality through the data network, they have not eliminated remaining drawbacks. Monitoring data network conditions between two remotely located end servers on an individual call basis entails a redundancy of operation which becomes considerable with a high volume of calls. Changing the routing of an Internet voice call to a traditional POTS call through the PSTN negates the benefits of Internet transmission, such as economies of cost and transmission efficiency, for the remainder of the call. A voice call that has been diverted to the PSTN because of transient high network traffic volume is not rerouted back through the data network when data network conditions again become favorable.

BRIEF SUMMARY OF THE INVENTION

The present invention overcomes the above noted drawbacks of earlier proposed systems and provides additional advantages in part by continuously monitoring the data traffic between two end nodes of a data internetwork. The term "monitoring" is used in a generic sense to include, for example, measuring any in a range of pre-defined functions such as response time, percentage utilization, packets per second (packet forwarding rate), throughput, errors per second, packet loss rate, data transfer rate (kilobytes per second), etc. An advantage of the invention is that monitoring can be performed dynamically without initiation upon each call.

Calls between two end location gateway servers of the data internetwork can be diverted, during periods of unacceptable network conditions, through the PSTN network. An additional advantage of the present invention is that a plurality of such diverted calls, which may be subscribed for at a reduced data communication transmission rate, may be multiplexed into a single ISDN or T1 channel, thereby permitting a sharing of the more expensive cost of PSTN routing.

Incoming calls are appropriately formatted for digital transmission, including compression when applicable, by the gateway servers and multiplexed for transmission either through the data network or back through an ISDN channel or the like through the PSTN. The invention thus has an additional advantage of expeditiously re-routing diverted calls back through the data internetwork when data network conditions improve. Calls are thus restored to the subscribed service with the concomitant cost reduction advantages.

Additional advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings, throughout the various figures of which like elements are depicted by the same reference numerals, and description are to be regarded as illustrative in nature, and not as restrictive.

DETAILED DESCRIPTION OF THE INVENTION

Figure 1:
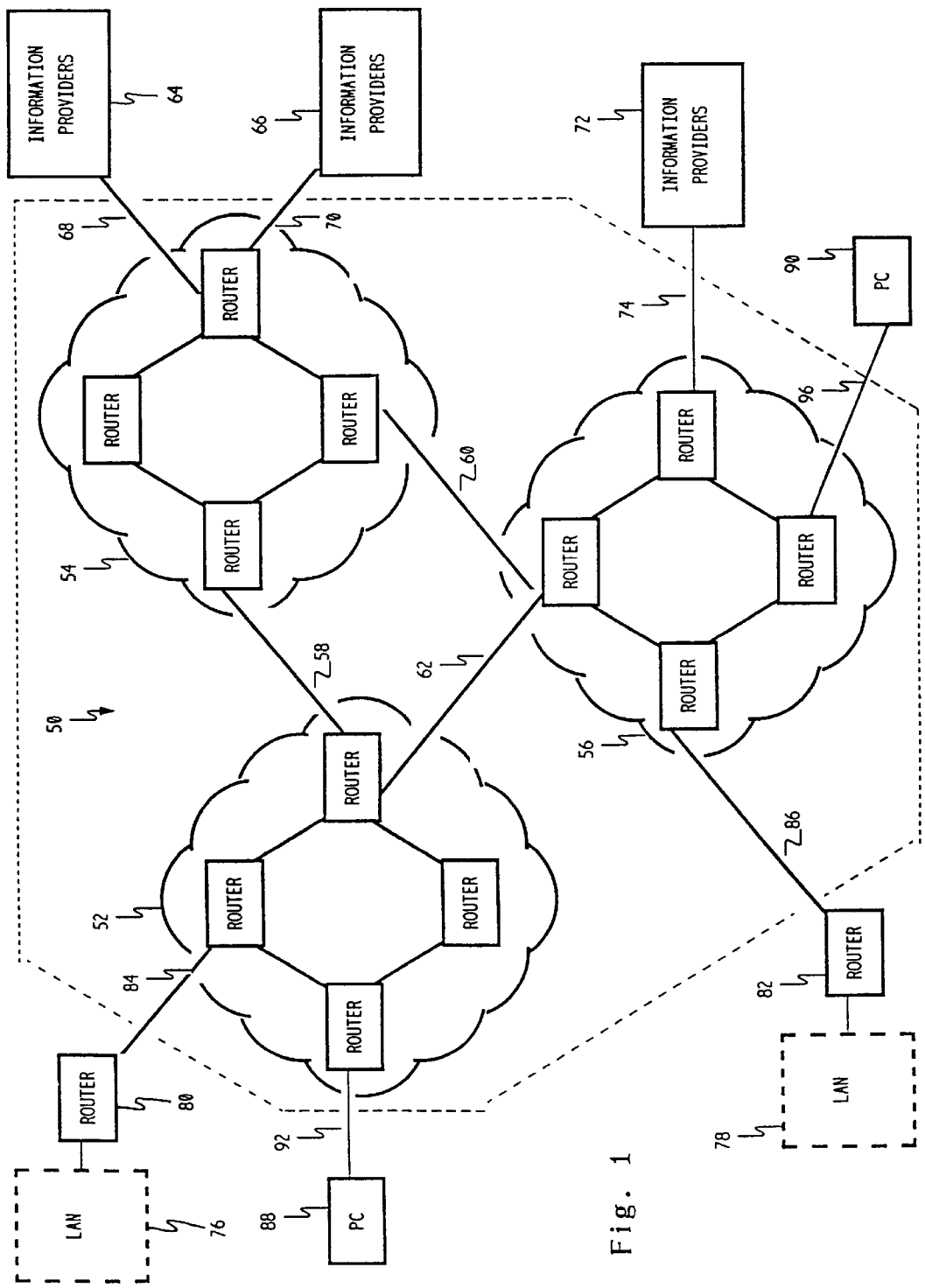
FIG. 1 is a simplified diagram of the Internet.
Figure 2:
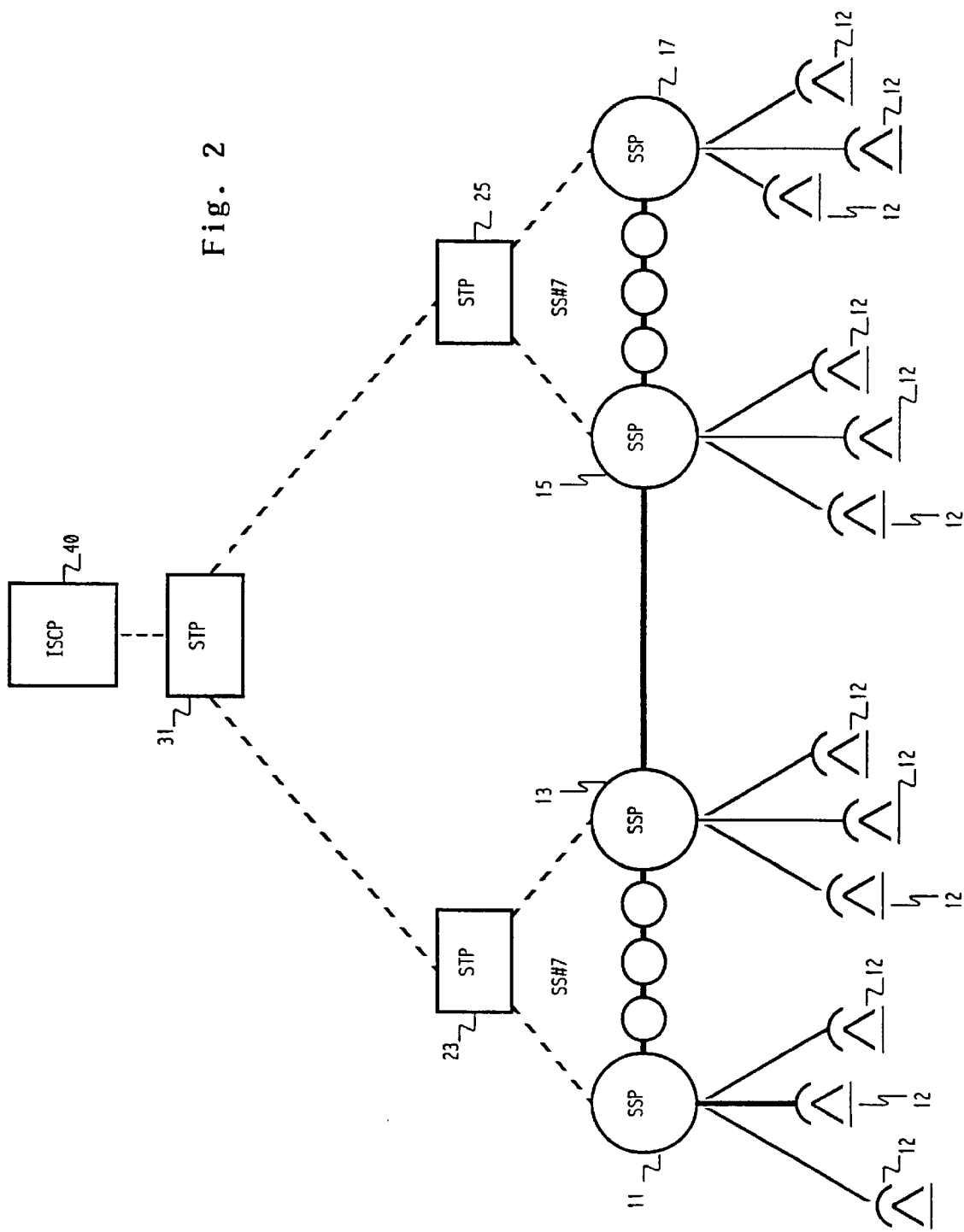
FIG. 2 is a simplified block diagram of a Public Switched Telephone Network (PSTN) that comprises a Common Channel Interoffice Signaling (CCIS) system and voice communication network that perform as an Advanced Intelligent Network (AIN) system.

FIG. 2 is a depiction of the PSTN AIN architectural environment that is considerably simplified for explanation purposes. The full network and operating environment for the invention may comprise multiple central offices, diverse interconnections, and provisions for reliability through redundancy, all of which need not be shown for developing an understanding of the invention. Service Switching Points (SSPs) 11, 13, 15, 17 represent central office (CO) switching systems that are appropriately equipped programmable switches present in the telephone network. Subscriber lines individually connect SSPs to subscriber premises at which locations telephones 12 or other communication devices are connected. As well known, the SSPs recognize AIN type calls, launch queries to the ISCP and receive commands and data from the ISCP to further process the AIN calls. In the illustrated embodiment, the CO-SSPs are end offices.

SSP capable central office switching systems typically contain a programmable digital switch with CCIS communications capabilities. One example of an SSP capable CO switch is a 5ESS type switch manufactured by AT&T. Other vendors, such as Northern Telecom and Seimens, manufacture comparable digital switches that may serve as the SSPs. A more detailed description of an exemplary SSP type CO is presented in the commonly assigned copending application, Ser. No. 08/248,980, filed May 25, 1994, now U.S. Pat. No. 5,572,583, issued Nov. 5, 1996, hereby incorporated by reference herein.

The SSP type COs 11 and 13 are shown connected to a first local area STP 23, SSP-COs 15 and 17 being connected to a second local area STP 25. The connections to the STPs are for signalling purposes. The control part of SS7 protocol is known as Integrated Services Digital Network User Part (ISUP). ISUP determines the procedures for setting up, coordinating, and taking down trunk calls on the SS7 network.

Signaling between switching offices is required for transmitting routing and destination information, for transmitting alerting messages such as to indicate the arrival of an incoming call, and for transmitting supervisor information, e.g. relating to line status. Signaling between offices can use 'in-band' transport or 'out-of-band' transport.

In-band signaling utilizes the same channel that carries the communications of the parties. In a voice telephone system, for example, one of the common forms of in-band signaling between offices utilizes multi-frequency signaling over voice trunk circuits. The same voice trunk circuits also carry the actual voice traffic between switching offices. In-band signaling, however, tends to be relatively slow and ties up full voice channels during the signaling operations. In telephone call processing, a substantial percentage of all calls go unanswered because the destination station is busy. For in-band signaling, the trunk to the end office switching system serving the destination is set-up and maintained for the duration of signaling until that office informs the originating office of the busy line condition. Thus, in-band signaling greatly increases congestion on the voice traffic channels. In-band signaling also is highly susceptible to fraud by hackers who have developed devices that mimic in-band signaling.

Out-of-band signaling has evolved to mitigate the above-described problems. Out-of-band signaling utilizes separate channels, and in many cases separate switching elements. Congestion on the channels carrying the actual communication traffic is thereby considerably reduced. Unauthorized simulation of signaling messages which ride on an out-of-band channel or network is virtually impossible. As out-of-band signaling utilizes its own signal formats and protocols, unconstrained by protocols and formats used for the actual communication, out-of-band signaling typically is considerably faster than in-band signaling.

Out of-band-signaling networks typically include data links and one or more packet switching systems. Out-of-band signaling for telephone networks is often referred to as Common Channel Signaling (CCS) or Common Channel Interoffice Signaling (CCIS). Most such signaling communications for telephone networks utilize signaling system 7 (SS7) protocol. An SS7 compliant CCIS network, such as illustrated in FIG. 2, comprises data Signal Transfer Points (STPs) and data links between the STPs and various telephone switching offices of the network. The STPs are program controlled packet data switching systems. In normal call processing operation, an STP will receive a packet data message from another node of the network, for example from an end office switching system. The STP analyzes point code information in the packet and routes the packet according to a translation table stored within the STP. This translation table is static. Any packet having a particular point code is output on a port going to the next CCIS signaling node specified by translation of that point code.

Each local area STP can connect to a large number of the SSP-COs, as indicated for ease of illustration merely by the circles below STPs 23 and 25. The central office SSPs are interconnected to each other by trunk circuits for carrying telephone services. The overall network may contain end offices without SSP functionality. Such end offices will forward calls to one of the SSPs if such treatment is required. Also, certain switching offices within the network, whether SSPs or not, may function primarily as tandem type offices providing connections between trunk circuits only.

The local area STPs 23 and 25, and any number of other such local area STPs (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSPs or not, may function primarily as tandem type offices providing connections between trunk circuits only.

The links between the central office switching systems and the local area STPs 23 and 25 are typically SS#7 type CCIS interoffice data communication channels. The local area STPs are in turn connected to each other and to the regional STP 31 via a packet switched network. The regional STP 31 also communicates with the ISCP 40 via a packet switched network.

Messages transmitted between the SSPs and the ISCP are formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node. Reference is made to the aforementioned copending application, Ser. No. 08/248,980, filed May 25, 1994, for a more detailed description of the AIN network.

The ISCP 40 is an integrated system that contains a data base. In the AIN network system, certain calls receive specialized AIN type processing under control of data files stored in the ISCP data base. Such files contain call processing records (CPRs) associated with respective AIN subscribers. Information contained in the CPRs relate to the AIN service or services to which the customer subscribes. The SSP type local offices of the public telephone network include appropriate data in their translation tables for customers subscribing to AIN services to define certain call processing events identified as AIN "triggers". The SSP uses the translation table data to detect a triggering event during processing of calls to or from such AIN service subscribers. Upon detection of such event, the SSP suspends processing of a call and activates a query and response type AIN interaction with the ISCP. Completion of call processing ensues after sufficient information is exchanged between the SSP and the ISCP. For ordinary telephone service calls that are not subject to enhanced treatment, there would be no event to trigger AIN messaging. The local and toll office switches would function normally and process such calls without referring to the ISCP data base for instructions.

Figure 3:
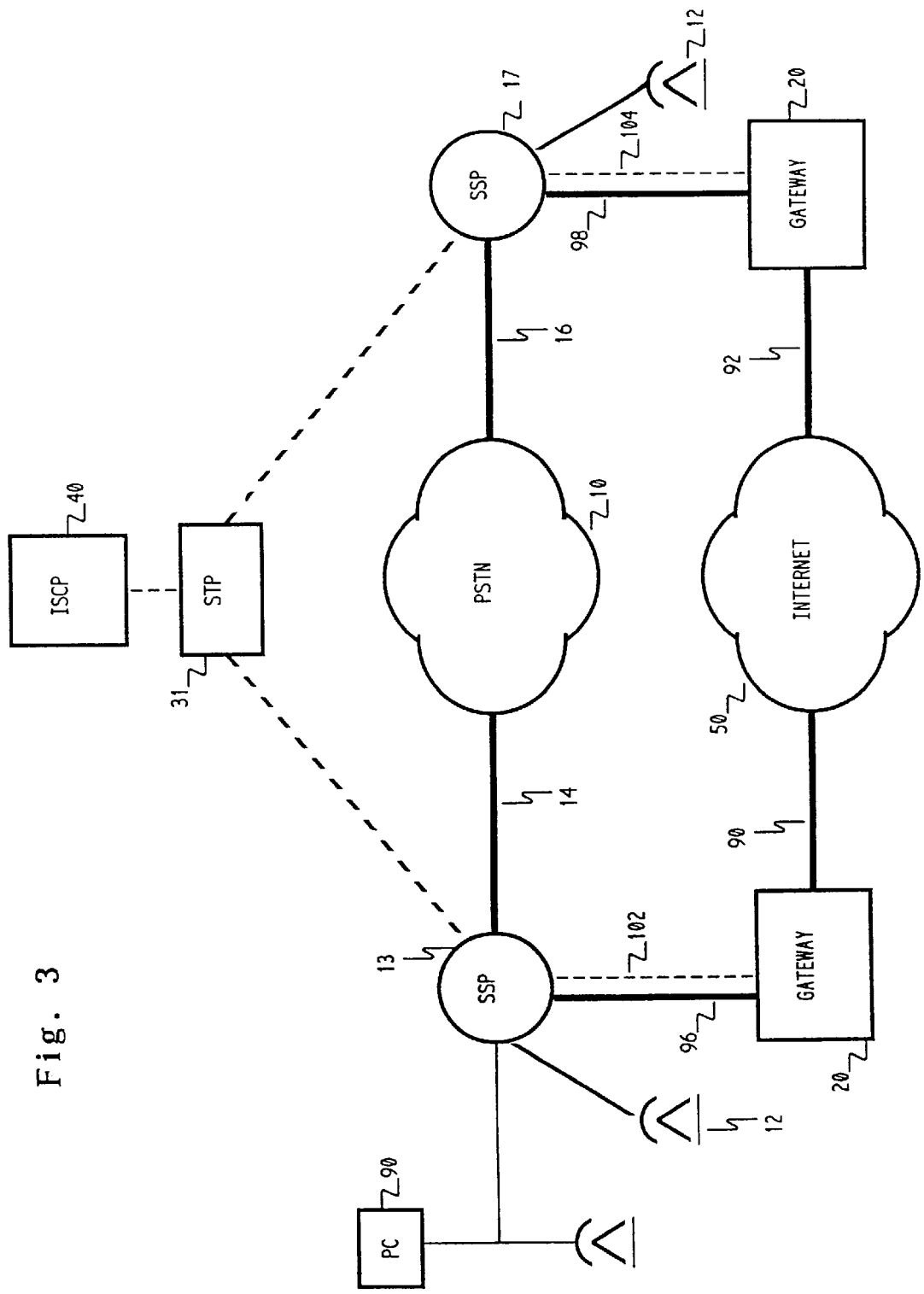
FIG. 3 is a simplified block diagram of an AIN controlled PSTN, such as the type shown in FIG. 2, which illustrates architecture for alternatively routing calls between stations either through the PSTN or Internet.

FIG. 3 is a simplified block diagram of an AIN controlled PSTN, such as the type shown in FIG. 2, with additional architecture for implementing alternative Internet routing. It is to be understood that the Internet representation in this figure, as well as throughout this disclosure, is illustrative of any packet network of routers that allows voice traffic to be packetized and sent over a shared network. The use of the phrases "Internet," "data internetwork" and "data packet network" or the like are used interchangeably throughout this description. SSP capable central offices 13 and 17, which may be located in the same or different states and regions, are connected by trunks 14 and 16 respectively to the PSTN indicated by a cloud 10. Each central office is connected by local loops to subscribers customer premises equipment (CPE) such as telephone terminals 12 and PC 90. The telephone 12 may be a standard telephone used for Plain Old Telephone Service (POTS), with conversion of analog voice to digital signals performed at a central office, or a so-called "Internet Phone" that outputs digital voice signals. The SSPs 13 and 17 are connected by CCIS links to STP 31 which in turn may be connected to ISCP 40. While the STP functionality is here shown as constituting a single STP it will be appreciated that this is for the purpose of simplicity only and that a hierarchy of STPs may be involved, the remaining portion of the system represented generally within the PSTN cloud 10 for simplicity.

Each of the central office SSPs 13 and 17 is connected to gateway 20 by trunks 96 and 98. Alternatively, the gateway hardware may be situated at the central office and associated with the switching system. The gateway will be described in further detail hereinafter. The gateways may be provided with SSP capabilities and connected into the CCIS network directly to an STP or, as illustrated by the links 98 and 102 to the SSPs 13 and 17. The gateways may be linked together for signaling purposes by conventional F links. The gateways are connected to the Internet cloud by T1/T3 trunks 90 and 92.

Figure 4:
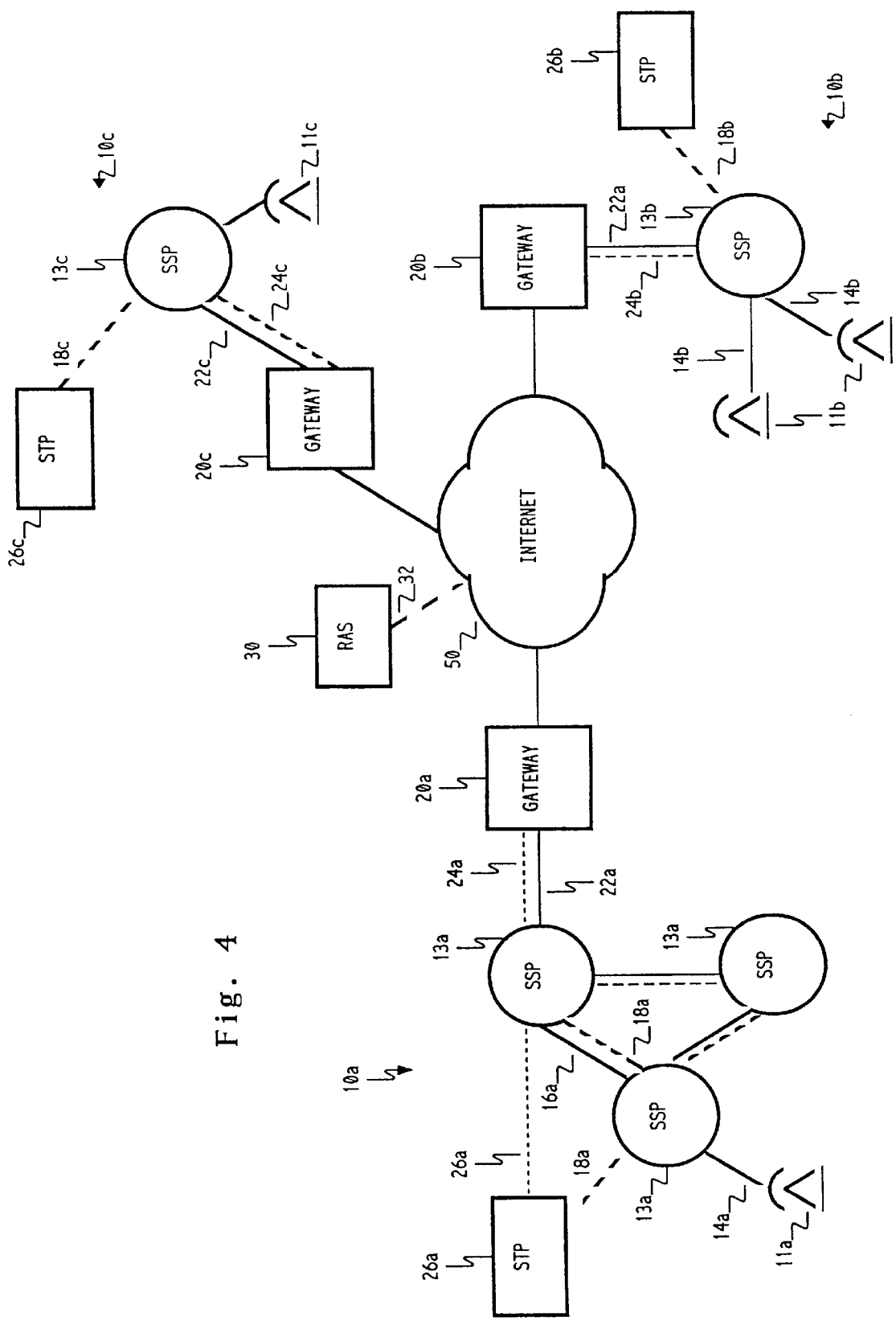
FIG. 4 a simplified block diagram illustrating the architecture of a telecommunications sytem using a wide area packet switched network such as the Internet, in combination with a plurality of PSTNs as used in the present invention.

FIG. 4 is a block diagram illustrating the architecture of a telecommunications system using a wide area packet switched network such as the Internet, particularly with interaction with a plurality of PSTNs over significant distances. PSTNs 10a, 10b, and 10c may be considered to be operating in different geographical regions. For example, each network may be a public switched telephone network such as a Regional Bell Operating Company (RBOC), or a private communication network having a limited service area. Each network has at least one assigned number code, such as an area code, that uniquely identifies service areas of that network. Each network also includes a plurality of interconnected switching systems 13a 13c serving customer premises terminals 11 via local loop connections 14. Each of networks 10a–10c, respectively, also includes trunk lines 16a–16c and signaling lines 18a–18c that support the interoffice signaling for the particular network.

Each telephone system also is coupled to a respective gateway 20a–20c that functions as an Internet telephony interface and server, providing an interface between the corresponding telephone system 10 and the Internet. It is to be understood that the use of the term "gateway" may be variously described as an Internet module or interface, gateway server, or gateway router. The gateways 20a–20c are shown connected to local central offices 13a–13c via a standard voice grade line or trunk connection 22a–22c, for example a T-1 or T-3 connection and connected into the CCIS network as indicated by the links 24a–24c to the illustrative STP 26a–26c.

A routing and administration server (RAS) 30, linked to the Internet, includes a routing and administration database for managing call routing translations and user access permissions. The RAS 30 is shown as an Internet node having a dedicated virtual path 32. The routing and administration database stores records for every area code/NNX served by a telephony system 10, along with the network address for the corresponding gateway 20.

Figure 5:
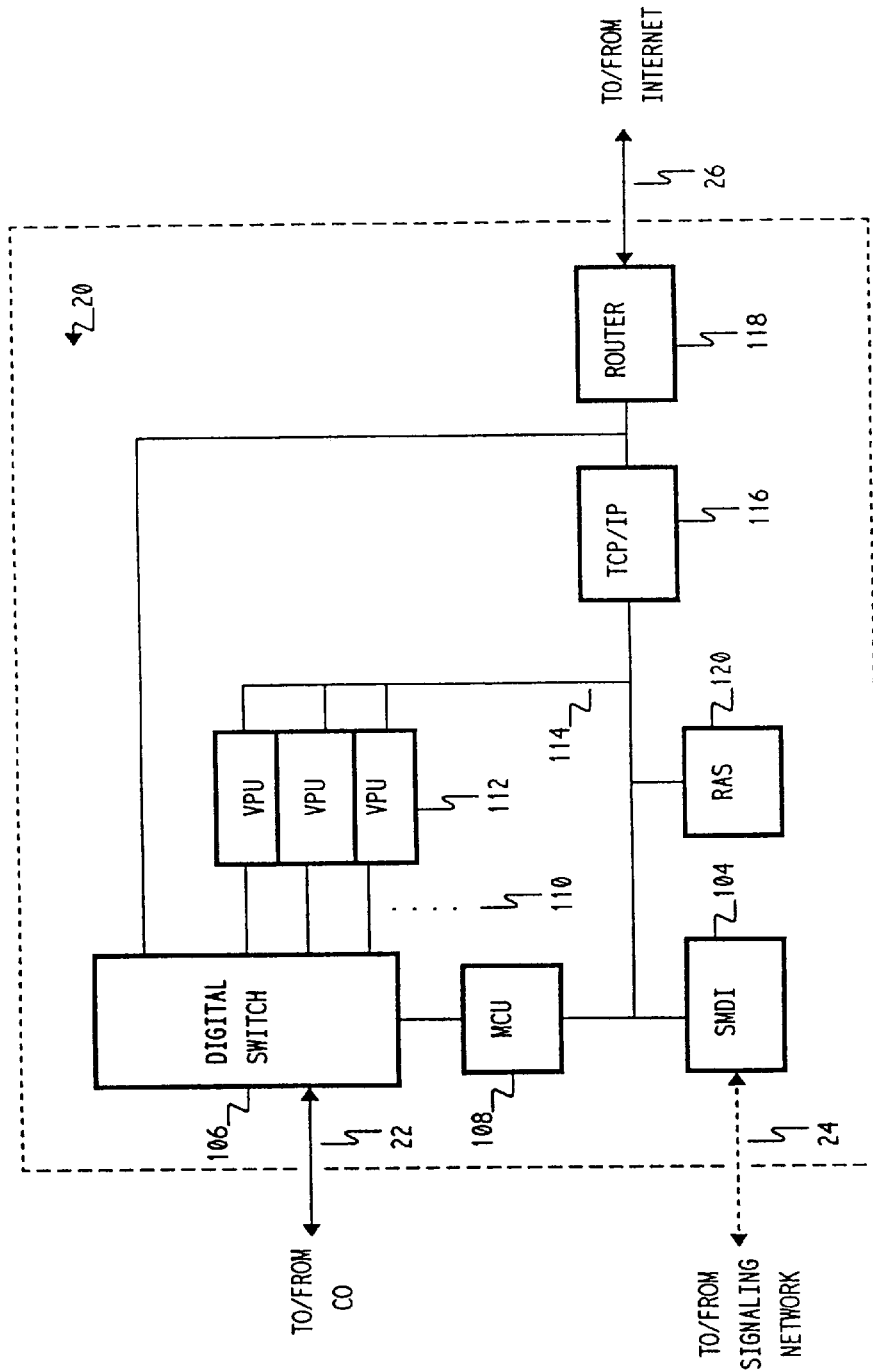
FIG. 5 is a block diagram of a preferred embodiment of a gateway 20 of FIG. 4.

FIG. 5 is a block diagram of a preferred embodiment of gateway 20 that comprises a combined telephony and Internet server platform. The platform performs basic telephony functions, including incoming call detection (ringing, trunk seizure, etc.), call supervision/progress detection (busy tone, disconnect, connect, recorded announcement, dialtone, speech, etc.), call origination, DTMF, call termination, call disconnect, switch hook flash, etc.

The platform includes a simplified message desk interface (SMDI) 104 that sends and receives signaling data to the CCS signaling network, a digital switch 106 that sends and receives communication traffic from the trunk 22, a master control unit (MCU) 108 that controls the overall operations of the gateway, including controlling the switch 106 to separate data traffic on the trunk 22 into single 64 kb/s data channels 110. The SMDI link also is used for signaling between the gateway and PSTN systems not equipped with CCIS signaling. The illustrated single entity trunk 22 is representative of a plurality of inputs to the digital switch, at least some of which are ISDN and/or T1. The data on each of the data channels 110 is compressed by a voice processor unit (VPU) 112 into communication data having a data rate of approximately 16 kbs or lower. The compressed communication data may be either voice data or other data, for example facsimile data.

The compressed communication data is output to a local area network (LAN) 114, for example an Ethernet-based network at 100 mbs. The LAN 114 carries data signals between the MCU 108 and the voice processing units 112. The system also includes T1 type digitized audio links 110 between the switch 106 and each of the VPU's 112. The LAN 114 transports data packets to a packet assembler/disassembler (PAD) 116 that packetizes data on the LAN 114 into TCP/IP packets for transport onto the Internet. The PAD 116 also recovers signaling and communication data from data packets received by the router 118. Hence, the PAD 116 can receive signaling information from the SMDI 104 originated from the signaling network, and output signaling data recovered from data packets received from the Internet to the SMDI 104 for subsequent call processing via the signaling links 24.

The gateway also may include an RAS database 120 that is an image of the database in the RAS server 30. The RAS database 120 enables translation information to be obtained without accessing the RAS 30 via the Internet. In this arrangement, the gateway would monitor its own bandwidth allocation as stored in the RAS database 120. The router 118 is of the type now generally used in Internet practice. Although not shown for purposes of explanation of the present invention, the router 118 may also be connected to a Domain Name Service (DNS) server and a Dynamic Host Configuration Protocol (DHCP) server of the type conventionally used by Internet Service Providers in existing Internet Service.

The MCU tracks traffic conditions on the Internet between the server and various remote servers. Monitoring of these conditions may be performed in any well known manner to determine, for example, response time, percentage utilization, packet forwarding rate, throughput, errors per second, packet loss rate, and data transfer rate. Performance level monitoring may be performed in a variety of ways. For example, a service test may comprise the sending of a rudimentary signal, known in the art as a "ping" signal, from the local router to the destination router and measuring the response time. The test signal generated by the quality test application is formatted for transport through the physical layer and the Internet to the destination end gateway router.

If traffic conditions for communication with a particular remote location are unacceptable, the MCU will signal the PSTN network to set up one or more ISDN or T1 pipeline connections between the gateway and the server at the remote location. Under direction of the MCU, appropriately addressed packets at the output of TCP/IP 116 destined for the remote server will be multiplexed and rerouted back through digital switch 106 through the pipeline to the remote server. The remote server will process packets thus received over the pipeline as it would with received Internet traffic, i.e., demultiplex the incoming stream, decompress the data signals, and transmit to the final destinations through the local PSTN.

Figure 6:
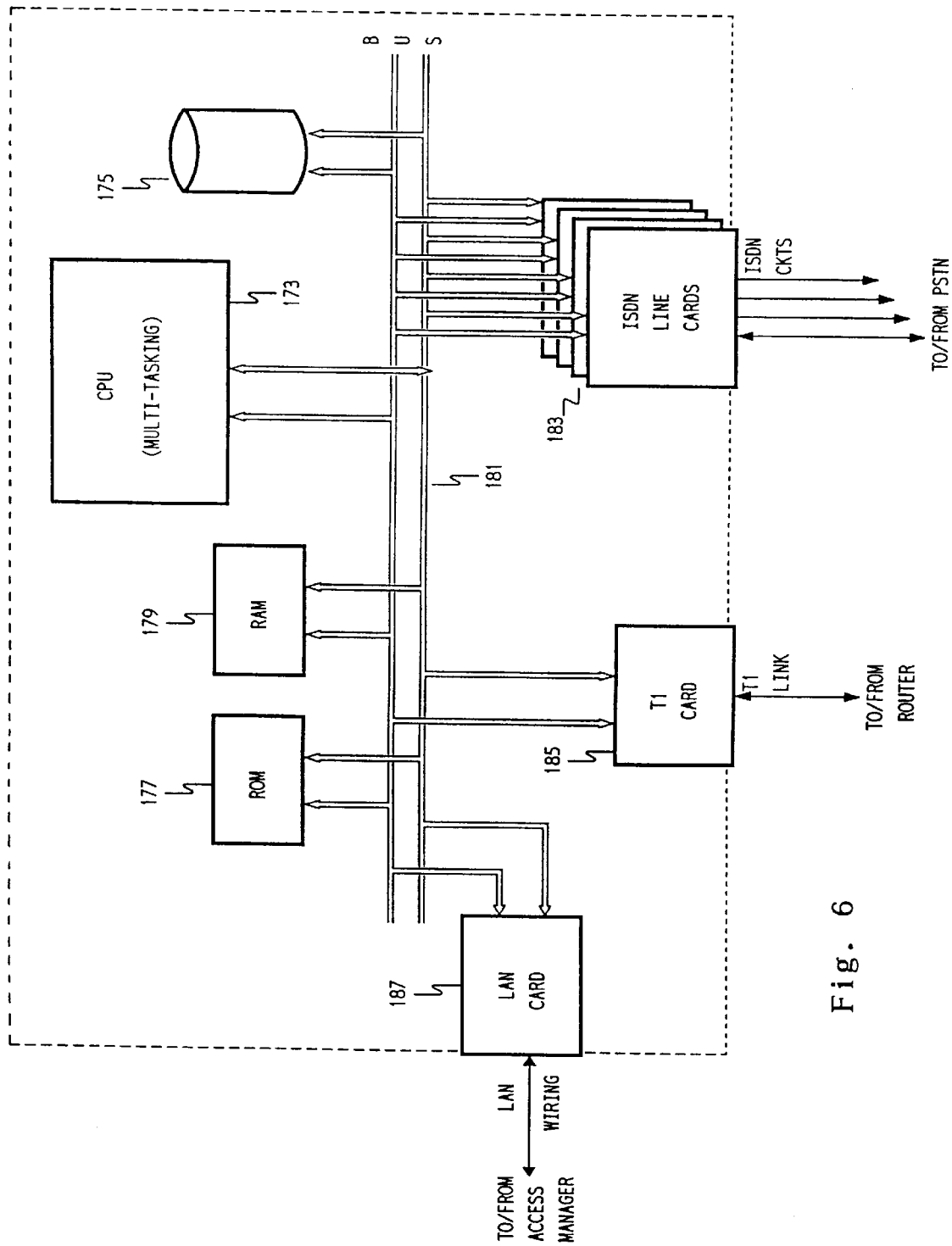
FIG. 6 is a simplified block diagram of the structural elements of one embodiment of a telephony platform portion of gateway 20.

FIG. 6 is a simplified block diagram of the structural elements of one embodiment of a telephony platform portion of gateway 20. In this implementation, the platform is essentially a computer having a multi-tasking central processing unit (CPU) 173, a disc drive system 175 for program and mass data storage, read only memory (ROM) 177 and random access memory (RAM) 179. A standard internal bus system 181 provides address, signaling and data communications between the elements of the gateway computer. The computer executes a variety of software routines, discussed below, to perform the various gateway functions and provide communications via the various inputs and outputs.

In this embodiment, the computer interfaces to other systems or devices. A number of ISDN line interface cards 183 provide two-wire, line sided interface to basic rate interface (BRI) or primary rate interface (PRI) type integrated services digital network (ISDN) lines. The line cards 183 permit transmission and reception of digitized voice over B channels each at 64 kbs, as well as transmission and reception of signaling data over a D channel at 16 or 64 kbs. T1 card 185 card provides a four-wire connection to a T1 circuit for two-way data communication at 1.544 Mbs. The T1 circuit connects to a router such as router 118 in FIG. 5 that couples to the Internet. The T1 circuit carries digitized, packetized voice information as well as related signaling data for communications through the Internet. In practice, the gateway is likely to include additional T1 cards.

In the illustrated embodiment, the computer serving as the telephone gateway includes a third interface, the local area network card 187. The LAN card 187 connects to an access manager application run by the MCU, for example, to permit the access manager to send and receive certain signaling messages via the Internet or through either the SMDI or ISDN D channel to the PSTN.

Figure 7:
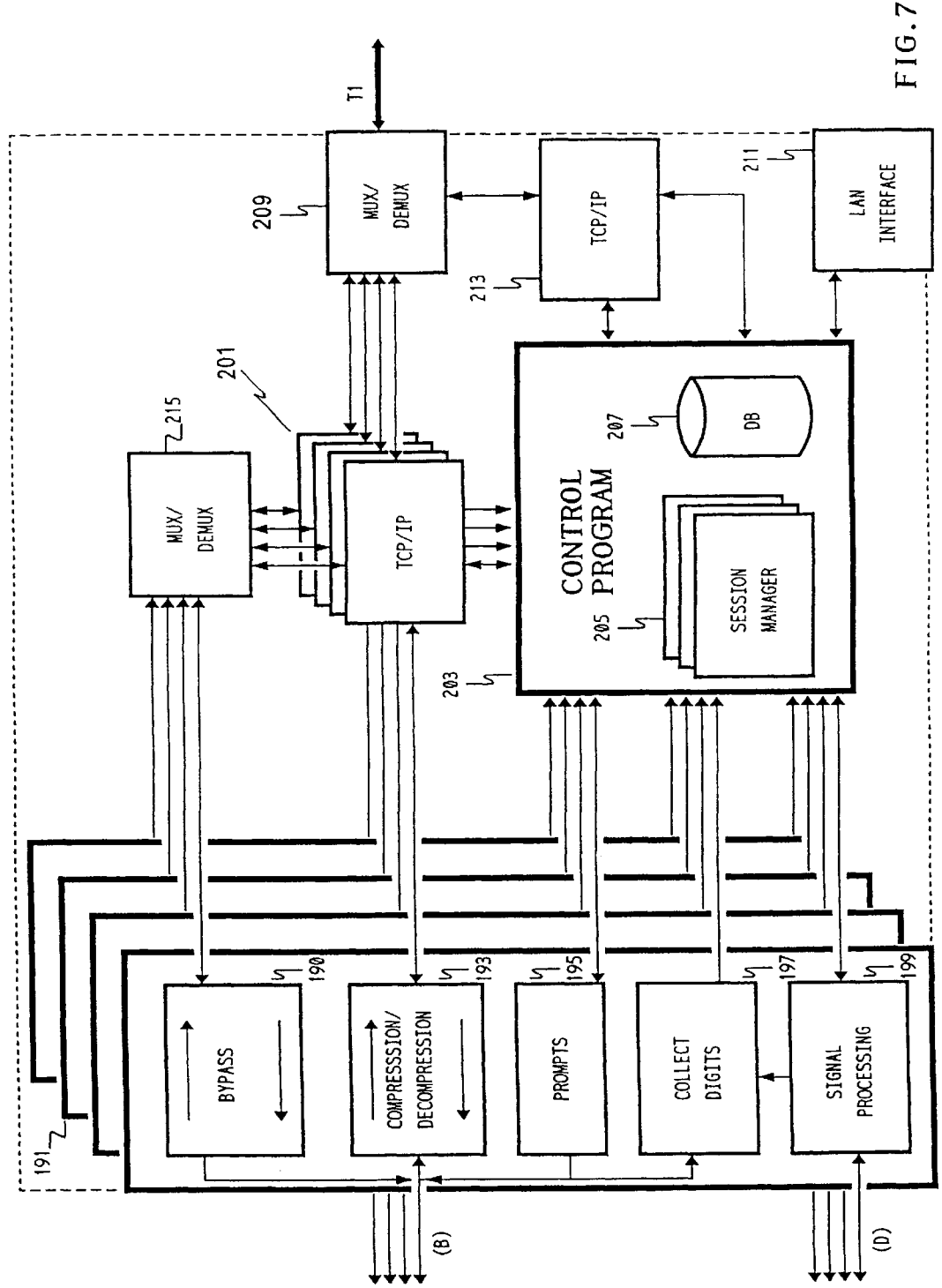
FIG. 7 is a block/flow diagram illustration of the functions implemented by the software running on the telephone gateway computer.
Figure 8A:
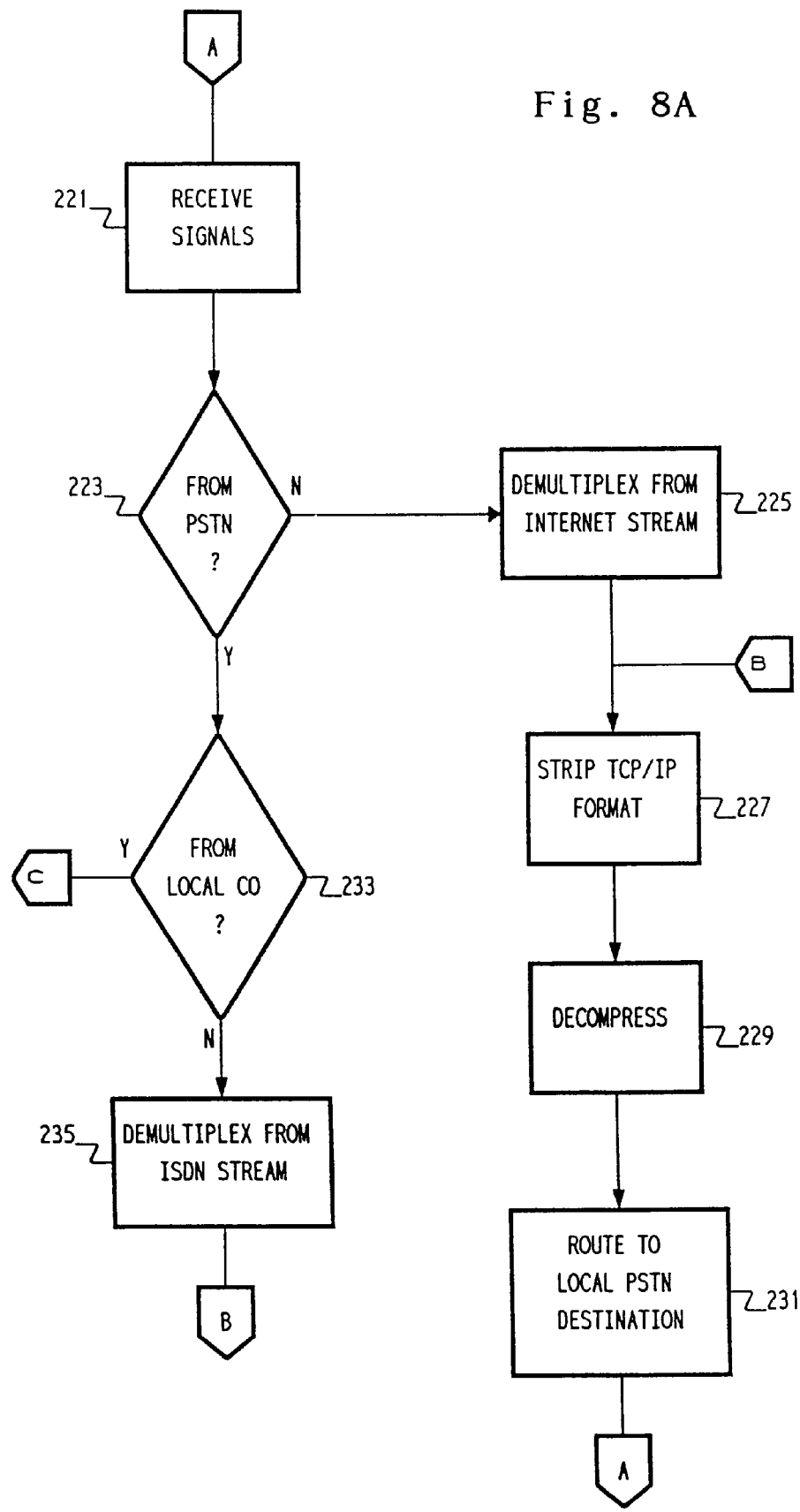
FIGS. 8A through 8D taken together form a simplified flow chart that illustrates operation of preferred embodiments of the invention.
Figure 8D:
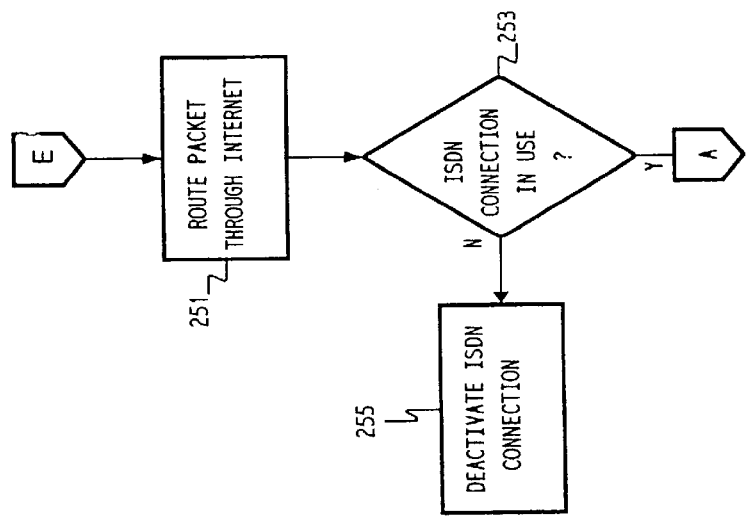
Figure 8C:
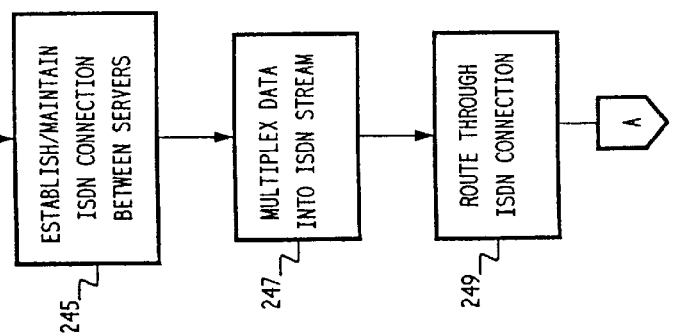
Figure 8B:
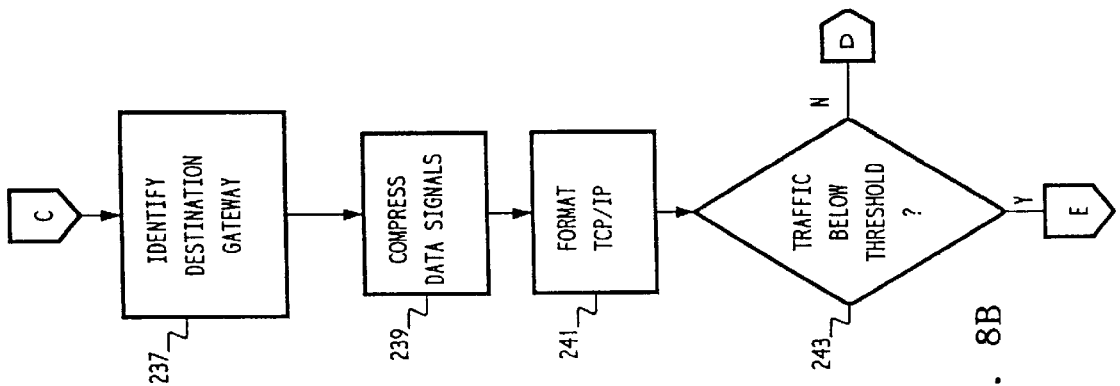

FIG. 7 is a block/flow diagram illustration of the functions implemented by the software running on the telephone gateway computer, which may run a standard operating system such as UNIX. The operating system facilitates execution of one or more application programs. The various application programs include executable code facilitating the actual processing as well as necessary data. Although the computer may run other application programs to perform unrelated communication functions, for purposes of this discussion the application programs that will run on the gateway computer relate to the telephone communications through the PSTN network and Internet, and applications for monitoring traffic conditions on the data network.

The software provides a number of call processing function routines 191 for processing incoming and outgoing calls via the ISDN line cards 183. One or more routines may be called and running as a number of separate copies for simultaneous processing of calls through the ISDN interface cards. Each of the call processing functions 191 includes subroutines 193 for compression and decompression. Each compression and decompression routine 193 compresses voice frequency information received via each B channel of one of the BRI or PRI type ISDN line circuits. The routine also decompresses voice data received via the Internet for uncompressed digital transport over the B channel. Although not illustrated, these functions may also be performed for communication via T1 lines.

The disc drive system 175 (FIG. 6) stores digitized voice prompt messages, for processing of certain types of calls by the telephone gateway. For example, if an Internet call is to be initiated by dialing an 800 number, the caller will be prompted to enter the telephone number of the called party. The call processing functions 191 include a subroutine 195 for transmitting such prompts over a B channel.

Subroutine 197 is provided for collection of digits input by users. The digits typically arrive via D channel signal processing routine 199, but digits may be received as dual tone multifrequency signals contained in the B channel voice frequency information or T1 line. The combination of prompts 195 and digit collection permits a number of interactive call processing services. For example, in some situations it may be desirable to prompt a caller for input of a PIN, or credit card information, and collect and check received digits before processing a call.

The signal processing routine 199 provides two-way ISDN signaling via the D channel of each ISDN line circuit. The D channel carries standard ISDN call related signaling messages. For example, incoming signals may indicate a new incoming call on one of the associated B channels and identify the call as a data call or a voice call. The signals for such a call may include the dialed number as well as a number associated with the origin of the call.

The software running on the gateway computer includes a control program 203. Such control program includes high level control software, session managers 205 and one or more databases 207 storing relevant control information. The control program 203 activates one session manager routine 205 for each call in progress. The session manager receives and processes various signals from the call processing function routines 191 and provides the necessary instructions to the routines to execute each individual call processing function. The control program 203 also controls or administers TCP/IP addressing functions and initiates certain necessary signaling communications through the Internet.

Routines 201 perform TCP/IP processing of the compressed voice channel. A single program or routine for this TCP/IP processing function may be called and running as a number of separate copies for simultaneous processing of voice data for a number of concurrent telephone calls. Each running TCP/IP processing routine 201 performs the two-way protocol processing to send and receive compressed, digitized voice data in TCP/IP packet format over the Internet. Outgoing TCP/IP packets are submitted to a MUX/DEMUX routine 209. The TCP/IP packets are aggregated and multiplexed for transmission over the T1 (or T3) circuit to the Internet. For incoming packets from the Internet, the routine 209 serves as a demultiplexer. The packets are separated and related to each two-way communication and submitted the appropriate TCP/IP processing routine to be changed back from TCP/IP format. Thereafter, the data are decompressed and routed through the PSTN network.

LAN interface 211 is provided for communication to and from the LAN 114 of FIG. 5. Via this interface routine the gateway can act as an Internet access server permitting the access manager to send and receive messages over the Internet. For these purposes, the software also includes a TCP/IP routine 213, controlled by the program 203, for TCP/IP packet processing of messages to and from the control program 203. The routine 213 encapsulates datagrams from the control program 203 into TCP/IP packets and supplies those packets to the MUX/DEMUX routine 202 for incorporation into the T1 rate stream going to the Internet. The MUX/DEMUX routine demultiplexes out any packets addressed for the control program 203 or the access manager and supplies those packets to the TCP/IP processing routine 213. The TCP/IP packets are in turn stripped off and provided as incoming datagrams for internal processing by the program 203 or for forwarding through interface routine 211.

The control program 203, through operation of its traffic monitoring program, may determine that traffic conditions in the Internet are not adequate to handle appropriately all communication traffic between the gateway and the particular remote gateway location. Through signal processing routine 199, as determined necessary by the control program session manager, an outgoing call is placed to set up one or more ISDN pipeline connections to the remote gateway through the PSTN. Once established, the pipeline can be used to route two way traffic between the locations until Internet conditions improve. The control program can determine on a dynamic basis the amount of outgoing data to be diverted to the pipeline in lieu of the Internet. Determination can be made "on the fly," i.e., on a packet by packet basis, or on a dedicated (at least temporarily) call basis. The ISDN pipeline is terminated when conditions in the Internet enable the full load of traffic communication.

Outgoing call data received on a B channel from the local PSTN, compressed by application 193, and formatted to TCP/IP packets by application 201, are directed under control program 203 to MUX/DEMUX 215 routine if the control program determines that such packets are to be transmitted to the ISDN pipeline instead of through the Internet. MUX/DEMUX 215, for purposes of illustration, is shown as being separate from MUX/DEMUX 209. The data packets are multiplexed by routine 215 into ISDN B channels for transmission over the PSTN ISDN pipeline to the remote gateway. Data for such diverted calls are inserted in the B channels while bypassing the compression/decompression routine 193, as indicated by bypass routine 90.

When received at the remote gateway, these packet data signals are distinguished from normal B channel voice data signals by recognition of the TCP/IP header information under control of the control program 203 at that gateway location. Incoming TCP/IP packets received in the ISDN B channels likewise bypass routine 193 until demultiplexed by routine 215 and processed by TCP/IP routine 201 out of TCP/IP format. Thereafter the data undergoes decompression by routine 193 and transmission through the B channel ISDN line as voice data signals to the appropriate PSTN destination.

FIGS. 8A through 8D taken together form a simplified flow chart that illustrates features of gateway operation for the preferred embodiment in which one or more ISDN lines are coupled to the gateway from the local PSTN network. In this example it is again assumed that the data network is the Internet, although the gateway may be used for interface with other data networks. At step 221, signals are received at the gateway. Step 223 represents determination of whether the received signals are received from the PSTN or the Internet. If the received data signals are from the Internet, then at step 225 the signals are demultiplexed from the Internet stream, stripped from TCP/IP format at step 227, decompressed at step 229, and routed to the local PSTN destination at step 231.

If the signals are received via the ISDN input, the signals either originate from a local PSTN subscriber location or from a remote server location that has diverted calls through the PSTN. The latter calls may be multiplexed among several calls in the ISDN B channel stream and in compressed, TCP/IP format. At step 233 determination is made as to whether the signals received from the PSTN are of local origination. This determination can be made by signal processing data received on the D channel under control of the session manager program. If the signals are multiplexed TCP/IP packets received over the ISDN B channel from the remote gateway, then at step 235 the signals are demultiplexed from the ISDN stream at step 235, stripped of TCP/IP format in step 227, decompressed at step 229 and routed to the local PSTN destination at step 231.

If it is determined at step 233 that the received signals are from either a newly placed call or an established call from local origin, the destination gateway is identified at step 237. The data signals are compressed at step 239 and formatted into TCP/IP packets at step 241. If monitored traffic conditions indicate that Internet communication is below an acceptable threshold level for additional traffic, as determined at step 243, the gateway will establish a call through the ISDN connection to the PSTN to the remote gateway at step 245. Such a call has been characterized as a pipeline in this disclosure in part because packets from a plurality of different calls can be multiplexed into one or more B channels, without permanent dedication of a call to the ISDN connection. That is, the established pipeline can remain active for additional packet transmission after specific calls have been terminated. Thus, step 245 involves establishing a new ISDN through connection if necessary or maintaining an established connection through which the packets are transmitted. At step 247 the packets are multiplexed into the ISDN data stream and routed through the PSTN to the remote gateway at step 249.

If it is determined in step 243 that traffic conditions in the Internet are acceptable, that is, above the minimum threshold level for transmission, then the TCP/IP packets are routed through the Internet at step 251. At this time, the need for the ISDN pipeline may no longer be necessary. At step 253 determination is made if any data traffic is being transmitted through the PSTN ISDN connection with the remote gateway. If not, and the Internet traffic conditions remain acceptable, then the ISDN pipeline is disconnected at step 255 whereby the cost of the long distance connection is curtailed.

As one advantageous result of the operation of this invention, quality of communication of voice calls addressed through data networks can be assured during the course of the calls through continuous monitoring of data network conditions and dynamic routing of data packets, in accordance with monitored conditions, either through the data network or as multiplexed digital signals through the public switched telephone network. Only the preferred embodiments of the invention and but a few examples of its versatility are shown and described in the present disclosure. It is to be understood that the invention is capable of use in various other combinations and environments and is capable of changes or modifications within the scope of the inventive concept as expressed herein. For example, the threshold level of acceptable data network conditions can be made variable individually for each call in dependence upon a subscribed minimum transmission rate. Several minimum data rates may be stored in a subscriber's CPR, for example 2.4 kbps., 4.8 kbps., and 9.6 kbps., with one of the rates as a default, or a single minimum subscribed rate may exist. Data as to presubscribed options for such rates may be signaled through the D channel, or elicited through prompts and digit collection using the call processing function routines. Thus in operation, the server, for the same network conditions, may route some packets through the Internet while diverting other packets through the ISDN pipeline in accordance with subscribed minimum levels.

We claim:

1. A method of controlling digital voice communication between a first gateway interfacing a public switched telephone network (PSTN) and a packet data network at a first location and a second gateway interfacing said packet data network and the PSTN at a second location, comprising the steps of:

converting voice call signals received at said first gateway, and addressed to a destination in said PSTN at said second location, to data packets;

monitoring data traffic conditions through said packet data network between said first and second locations; and in response to said monitoring step, routing said data packets to said second gateway through said PSTN if the monitored conditions are below a predetermined acceptable threshold level;

wherein said predetermined acceptable threshold level is a minimum acceptable data flow rate and said monitoring step comprises:

transmitting a request packet from said first gateway through said data packet network to said second gateway;

receiving a response packet; and measuring the round trip time duration therebetween.

2. A communications system comprising:

a public switched telecommunications network (PSTN) having a plurality of interconnected central office switching systems each connected to at least one subscriber line;

a data network separate from said switched telephone network comprising multiple remotely spaced routers for linking together paths of said data network using transmission control protocols to provide connectionless packet service between remote locations of said data network;

at least two of said central office switching systems connected to a respective interface to said data network, said central office switching systems providing selective connection between said interfaces and the subscriber lines connected to each of said central office switching systems;

means for establishing a data transmission pipeline through said switched telephone network between the two said interfaces, thereby bypassing said separate data network;

means for continually monitoring transmission traffic conditions in said separate data network and determining whenever data traffic conditions therein are below a predetermined acceptable threshold level;

means for routing voice call data packets through said pipeline between the two said interfaces in response to each determination by said monitoring means that data traffic conditions in said separate data network are below said predetermined acceptable threshold level and for routing voice call data packets through said separate data network in the absence of such said determination.

3. A communications system as recited in claim 2, wherein said means for routing comprises means for multiplexing voice call data packets of a plurality of different voice calls together in said pipeline.

4. A communications system as recited in claim 3, wherein said data transmission pipeline comprises at least one B channel of an ISDN connection.

5. A method of communicating voice telephone calls between telephone stations each connected through a respective switch to a public switched telephone network (PSTN) region at a first location and remotely located telephone stations each connected through a respective switch to a public switched telephone network (PSTN) region at a second location, comprising the steps of:

routing voice calls from the PSTN at said first location to a first gateway;

converting said voice calls to compressed digital data packets; and transmitting said compressed digital data packets to a second gateway connected to the PSTN at said second location, said transmitting step comprising:

routing said data packets through a data packet network between said first and second gateways if traffic conditions in said data packet network between said first and second gateways exceed a predetermined acceptable threshold level; and conveying said data packets through a data pipeline connection in said PSTN between said first and second gateways, thereby bypassing said data packet network, if said threshold level is not exceeded; wherein data traffic conditions through said packet data network are continually monitored for compliance with said threshold and said routing and conveying steps are alternatively performed throughout the course of each telephone call in dependence upon the monitored traffic conditions.

6. A method as recited in claim 5, wherein said conveying step comprises multiplexing data packets from a plurality of signals into a single data stream through said pipeline.

7. A method as recited in claim 6, wherein said data packet network is the Internet and said pipeline comprises at least one B channel of an ISDN connection.

8. A method as recited in claim 6, further comprising:

receiving multiplexed compressed data packets from said second gateway via said PSTN pipeline at said first gateway;

converting the received data packets into demultiplexed, decompressed voice digital signals; and transmitting said voice digital signals to a plurality of destinations in said first (PSTN) region.

9. A method of controlling digital voice communication during an interactive telephone call between two public switch telephone network (PSTN) subscriber lines said network interfacing with a wide area packet data network at first and second gateways at different locations respectively for said subscriber lines, said method comprising the steps of:

converting voice call signals received at said first gateway, and addressed to said PSTN subscriber line associated with said second gateway, to data packets;

routing the call between said first and second gateways through said wide area packet data network;

continually monitoring data traffic conditions through said packet data network between said first and second gateways; and in response to said monitoring step, changing the routing of said call between said first and second gateways to a communication path through said PSTN, thereby bypassing said wide area packet data network, if the monitored conditions are below a predetermined acceptable threshold level.

10. A method as recited in claim 9, wherein said converting step comprises compressing said voice signals and said routing step comprises multiplexing together compressed voice data packets into a common data stream.

11. A method as recited in claim 9, wherein said threshold level is variable and related to the identity of origination of the voice call signals.

12. A method as recited in claim 10, wherein said wide area data packet network is the Internet, and said converting step further comprises processing said voice call signals into TCP/IP format packets.

13. A method as recited in claim 10, wherein said changing step further comprises establishing an ISDN pipeline connection between said first and second gateways through the PSTN with at least one B channel comprising said common data stream.

14. A method as recited in claim 13, wherein said voice call signals are received at said first gateway from an ISDN input connection and further comprising the steps of:

receiving multiplexed TCP/IP data packets at said first gateway from said ISDN pipeline;

demultiplexing the received TCP/IP packets;

stripping TCP/IP format from said demultiplexed packets into voice data signals;

decompressing said voice data signals; and transmitting the decompressed voice data signals through at least one B channel to at least one destination in the PSTN at said first location.

15. A method as recited in claim 14, wherein said decompressed voice data signals are transmitted to a plurality of destinations.

16. A method for dynamically routing digital voice communication during the course of a voice telephone call comprising the steps of:

a) continually monitoring transmission traffic conditions in a wide area packet data network throughout the course of the call;

b) in response to said monitoring step, determining whether said traffic conditions fall below a predetermined acceptable threshold level;

c) in response to an acceptable traffic condition level as determined in said determining step, routing said telephone call in the form of data packets through said wide area packet data network;

d) in response to a determination of an unacceptable traffic condition in said determining step, routing said telephone call through a public switched telephone network that bypasses said wide area packet data network; and e) rerouting said call in accordance with said routing steps c) and d) each time that a determined change in traffic conditions with respect to said threshold level occurs during the course of the call.

* * * * *